US008539829B2

(12) United States Patent
Bardsley et al.

(10) Patent No.: US 8,539,829 B2
(45) Date of Patent: Sep. 24, 2013

(54) MAGNETOSTRICTIVE PROBE FUEL QUALITY SENSOR RETROFIT ASSEMBLY

(75) Inventors: Richard Bardsley, Sandhurst (GB); Kent Reid, Canton, CT (US)

(73) Assignees: Veeder-Root Company, Simsbury, CT (US); Danaher UK Industries Limited (GB)

( * ) Notice: Subject to any disclaimer, the term of this patent is extended or adjusted under 35 U.S.C. 154(b) by 260 days.

(21) Appl. No.: 13/176,808

(22) Filed: Jul. 6, 2011

(65) Prior Publication Data
US 2013/0008247 A1 Jan. 10, 2013

(51) Int. Cl.
*G01F 23/00* (2006.01)

(52) U.S. Cl.
USPC .......................................................... 73/313

(58) Field of Classification Search
USPC ............................................. 73/305–316, 319
See application file for complete search history.

(56) References Cited

U.S. PATENT DOCUMENTS

| | | | | |
|---|---|---|---|---|
| 4,194,395 | A | * | 3/1980 | Wood .......................... 73/304 C |
| 4,977,528 | A | | 12/1990 | Norris |
| 5,076,100 | A | | 12/1991 | Hunter et al. |
| 5,319,545 | A | | 6/1994 | McGarvey et al. |
| 5,400,253 | A | | 3/1995 | O'Connor |
| 5,423,457 | A | | 6/1995 | Nicholas et al. |
| 5,471,873 | A | * | 12/1995 | Nyce et al. ...................... 73/453 |
| 5,689,071 | A | | 11/1997 | Ruffner et al. |
| 5,734,851 | A | | 3/1998 | Leatherman et al. |
| 5,956,259 | A | | 9/1999 | Hartsell, Jr. et al. |
| 6,052,629 | A | | 4/2000 | Leatherman et al. |
| 6,435,204 | B2 | | 8/2002 | White et al. |
| 6,935,191 | B2 | | 8/2005 | Olivier et al. |
| 7,289,877 | B2 | | 10/2007 | Wilson |
| 7,454,969 | B2 | | 11/2008 | Hart |
| 2006/0248952 | A1 | * | 11/2006 | Jarvie .............................. 73/444 |
| 2010/0170338 | A1 | | 7/2010 | Prinstil et al. |
| 2010/0295565 | A1 | * | 11/2010 | Drack ........................... 324/693 |

FOREIGN PATENT DOCUMENTS

WO   2009089339 A2   7/2009

OTHER PUBLICATIONS

Veeder-Root, Mag Plus Probe Assembly Guide, 2011.
International Search Report and Written Opinion dated Aug. 6, 2012 for corresponding PCT Application No. PCT/US2012/035319, International Filing Date Apr. 27, 2012.

* cited by examiner

*Primary Examiner* — Hezron E Williams
*Assistant Examiner* — Naeem M Jahangir
(74) *Attorney, Agent, or Firm* — Nelson Mullins Riley & Scarborough LLP

(57) ABSTRACT

A retrofit assembly for installing a fuel quality sensor with a fuel level probe having a shaft extending through a tank interface into a fuel storage tank. The shaft, which comprises a magnetostrictive element extending therealong, is coupled with the fuel quality sensor. An isolation sheath is sized for receipt over the shaft and to extend between the fuel quality sensor and the tank interface. The sheath has a cross-sectional profile configured to define at least one passage between the sheath and the shaft when the sheath is received over the shaft. The passage(s) extend between a proximal end and a distal end of the sheath. Also provided is a product-level float comprising at least one product-level magnet for measuring the level of fuel in the fuel storage tank. The product-level float is configured to translate along the sheath with the level of fuel in the fuel storage tank.

20 Claims, 4 Drawing Sheets

MAGNETOSTRICTIVE PROBE FUEL QUALITY SENSOR RETROFIT ASSEMBLY

FIELD OF THE INVENTION

The present invention relates generally to devices for monitoring liquid fuel in storage tanks. More specifically, the present invention relates to a device used in conjunction with a magnetostrictive probe in a storage tank to retrofit a fuel quality sensor onto the magnetostrictive probe.

BACKGROUND OF THE INVENTION

Fueling environments normally have fuel storage tanks, typically located underground, from which liquid fuel (e.g., gasoline or diesel fuel) is pumped to dispensers. To comply with environmental laws, rules, and regulations, these storage tanks may be double-walled and associated with various inventory reconciliation systems. Typically, these inventory reconciliation systems comprise a magnetostrictive probe which extends into the tank and comprises one or more floats adapted to move vertically therealong. The floats may contain magnets which, in conjunction with a tank monitor or other suitable control system, facilitate determination of the level (and thus amount) of the product stored in the tank. In particular, a magnetostrictive probe usually comprises a product-level float that is designed to float on the interface between fuel and vapor/air in the storage tank ullage. One example of a magnetostrictive probe may be the Mag Plus™ Leak Detection Probe, sold by Veeder-Root Company of 125 Powder Forest Drive, Simsbury, Conn. 06070, the assignee of the present application.

Additionally, water may enter fuel storage tanks in various circumstances. Because water is more dense than liquid fuel, it typically resides in a layer at the bottom of the storage tank. Thus, magnetostrictive probes often comprise a water level float to determine the level of water in the storage tank. Because of the distinct difference in densities between water and liquid fuel, water level floats can be designed to float on the fuel-water interface.

The measurements from these floats are reported to the tank monitor so that the operator of the fueling environment may evaluate and reconcile fuel inventory and/or detect leaks, as is well understood. One example of a tank monitor may be the TLS-450 Monitoring System, also sold by Veeder-Root Company. Further information on the construction and operation of magnetostrictive probes in fueling environments is provided in U.S. Pat. Nos. 5,076,100, entitled "Magnetostrictive Transducer Measuring System," and 7,454,969, entitled "Fuel Density Measuring Device, System, and Method Using Magnetostrictive Probe Buoyancy," both of which are incorporated by reference herein in their entireties for all purposes.

However, modern fueling environments may store liquid fuels which are mixtures of gasoline and ethanol in various ratios, rather than "pure" gasoline. For example, E10 is a liquid fuel comprising 90% gasoline and up to 10% ethanol. Generally, it is known that gasoline containing ethanol will separate into an upper layer of gasoline and a lower layer of aqueous ethanol if the water concentration in the fuel becomes too great. It is desirable to know when this "phase separation" occurs so that pumping of fuel from the storage tank can be suspended until corrective action is taken.

More specifically, as small amounts of water enter the storage tank containing a gasoline/ethanol mixture, the ethanol absorbs the water. As the amount of water increases, the ternary mixture becomes unstable and most of the ethanol and water precipitate out from the gasoline to form an aqueous ethanol layer below a layer of gasoline and some ethanol. The aqueous ethanol layer has a lower density than pure water but a slightly higher density than gasoline.

As noted above, water level floats are designed to float on the interface between water and gasoline. However, the aqueous ethanol layer caused by phase separation is less dense than water, and thus the water level float may not be buoyant enough to float on this phase separation interface. Therefore, the inventory reconciliation system may not detect phase separation, and an unsuitable fuel or aqueous ethanol mixture may be pumped to a dispenser and/or a customer's vehicle.

"Fuel quality sensors" have been proposed to detect the onset and occurrence of phase separation. Such sensors are designed to determine the composition of the fuel mixture based on certain electrical characteristics such as capacitance.

SUMMARY

The present invention recognizes and addresses disadvantages of prior art constructions and methods. In accordance with one aspect, the present invention provides a retrofit assembly for use with a fuel level probe. The fuel level probe has a shaft extending through a tank interface into a fuel storage tank, and the shaft comprises a magnetostrictive element extending therealong. The retrofit assembly comprises a fuel quality sensor for mounting to a terminal end of the probe. An isolation sheath having a proximal end and a distal end is also provided. The isolation sheath is sized to be received over the fuel level probe shaft and extends between the fuel quality sensor and the tank interface. The isolation sheath has a cross-sectional profile configured to define at least one passage when the isolation sheath is received over the fuel level probe shaft. The at least one passage extends between the proximal end and the distal end of the isolation sheath. The retrofit assembly also comprises a product-level float comprising at least one product-level magnet for measuring the level of fuel in the fuel storage tank. The product-level float is configured to translate along the isolation sheath as the level of fuel in the fuel storage tank changes.

According to a further aspect, the present invention comprises a method of installing a fuel quality sensor with a fuel level probe in a fuel storage tank. The method comprises the step of extending an isolation sheath over a shaft of the probe, where the isolation sheath defines at least one longitudinal passage between the isolation sheath and the fuel level probe shaft. Further, the method comprises providing a product-level float along the isolation sheath for measuring the level of fuel in the fuel storage tank. The product-level float is configured to translate along the isolation sheath. Finally, the method comprises extending wiring between the fuel quality sensor and the tank interface along the at least one longitudinal passage.

According to a further embodiment, the present invention comprises a fuel level probe for use with a fuel storage tank. The fuel level probe comprises a shaft extending through a tank interface into the fuel storage tank, and the shaft comprises a longitudinal magnetostrictive element. The fuel level probe also comprises a fuel quality sensor coupled with a terminal end of the shaft in the fuel storage tank and an isolation sheath installed along the fuel level probe shaft between the fuel quality sensor and the tank interface. The isolation sheath defines a plurality of longitudinal passages between the isolation sheath and the fuel level probe shaft for carrying wiring extending from the fuel quality sensor out of the fuel storage tank. The fuel level probe further comprises a product-level float for measuring the level of fuel in the fuel storage tank, and the product-level float is configured to translate along the isolation sheath. The product-level float comprises at least one product-level magnet adapted for electromagnetic communication with the magnetostrictive element across the isolation sheath.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
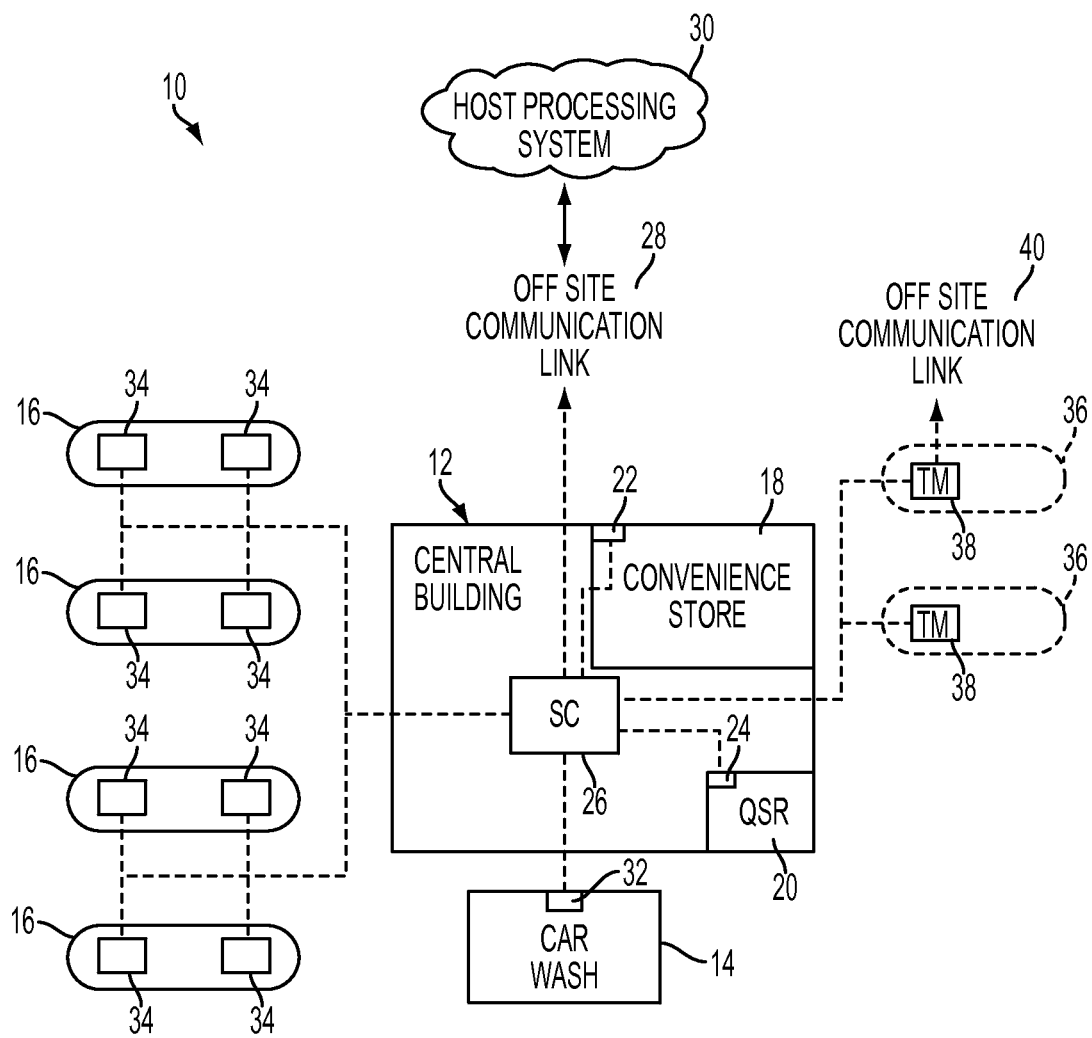
FIG. 1 is a diagrammatic representation of an exemplary fueling environment in which embodiments of the present invention may be used.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 provides a schematic illustration of an exemplary fueling environment 10 in which embodiments of the present invention may be used. Fueling environment 10 may comprise a central building 12, a car wash 14, and a plurality of fueling islands 16. The central building 12 need not be centrally located within the fueling environment 10; rather, central building 12 is the focus of the fueling environment 10 and may house a convenience store 18 and/or a quick serve restaurant 20 therein. Both convenience store 18 and quick serve restaurant 20 may include a point of sale (POS) 22, 24, respectively.

Central building 12 may further house a site controller (SC) 26, which in an exemplary embodiment may be the PASSPORT® POS system, sold by Gilbarco Inc. of Greensboro, N.C., although third party site controllers may be used. Site controller 26 may control the authorization of fueling transactions and other conventional activities as is well understood, and site controller 26 may preferably be in operative communication with each POS. Alternatively, site controller 26 may be incorporated into a POS, such as POS 22 if needed or desired.

Further, site controller 26 may be associated with an off-site communication link 28 allowing communication with a remote host processing system 30 for credit/debit card authorization, content provision, reporting purposes or the like, as needed or desired. In one embodiment, communication link 28 may be a stand alone router, switch, or gateway, although it should be appreciated that site controller 26 may additionally perform the functions of, and therefore replace, such a device. The off-site communication link 28 may be routed through the Public Switched Telephone Network (PSTN), the Internet, both, or the like, as needed or desired. Remote host processing system 30 may comprise at least one server maintained by a third party, such as a financial institution.

Car wash 14 may have a POS 32 associated therewith that communicates with site controller 26 for inventory and/or sales purposes. Car wash 14 alternatively may be a stand alone unit. Note that car wash 14, convenience store 18, and quick serve restaurant 20 are all optional and need not be present in a given fueling environment.

Fueling islands 16 may have one or more fuel dispensers 34 positioned thereon. Fuel dispensers 34 may be, for example, the ENCORE® dispenser sold by Gilbarco Inc. of Greensboro, N.C. Fuel dispensers 34 are in electronic communication with site controller 26 through any suitable link, such as two wire, RS 422, Ethernet, wireless, etc. if needed or desired.

Fueling environment 10 also has one or more fuel storage tanks 36 adapted to hold fuel therein. In a typical installation, fuel storage tanks 36 are positioned underground, and may be referred to as USTs (i.e., underground storage tanks). However, those of skill in the art will appreciate that the present invention is also well-adapted for use in other storage tanks, including above-ground storage tanks. As described below, a magnetostrictive probe is associated with each fuel storage tank 36. Further, each magnetostrictive probe is connected to a tank monitor (TM) 38 associated with each fuel storage tank 36. Tank monitors 38 communicate with the magnetostrictive probe and may additionally communicate with fuel dispensers 34 (either through site controller 26 or directly, as needed or desired). Thus, tank monitors 38 may determine amounts of fuel dispensed and compare fuel dispensed to current levels of fuel within fuel storage tanks 36 to determine if fuel storage tanks 36 are leaking. Those of skill in the art will appreciate that, in many installations, only one tank monitor 38 may be provided and that tank monitor 38 may often be located in central building 12.

Tank monitors 38 may also communicate with site controller 26 and may be associated with an off-site communication link 40 for leak detection reporting, inventory reporting, or the like. Much like off-site communication link 28, off-site communication link 40 may be through the PSTN, the Internet, both, or the like. If off-site communication link 28 is present, off-site communication link 40 need not be present and vice versa, although both links may be present if needed or desired. Finally, tank monitor 38 may preferably employ algorithms and use data from a fuel quality sensor to predict and identify phase separation.

Further information on and examples of fuel dispensers and retail fueling environments are provided in U.S. Pat. Nos. 6,435,204 (entitled "Fuel Dispensing System"); 5,956,259 (entitled "Intelligent Fueling"); 5,734,851 (entitled "Multimedia Video/Graphics in Fuel Dispensers"); 6,052,629 (entitled "Internet Capable Browser Dispenser Architecture");

5,689,071 (entitled "Wide Range, High Accuracy Flow Meter"); 6,935,191 (entitled "Fuel Dispenser Fuel Flow Meter Device, System and Method"); and 7,289,877 (entitled "Fuel Dispensing System for Cash Customers"), all of which are incorporated herein by reference in their entireties for all purposes. For more information about tank monitors and their operation, reference is made to U.S. Pat. Nos. 5,423,457 (entitled "Real time tank product loss detection system"); 5,400,253 (entitled "Automated Statistical Inventory Reconciliation System for Convenience Stores and Auto/truck Service Stations"); 5,319,545 (entitled "System to Monitor Multiple Fuel Dispensers and Fuel Supply Tank"); and 4,977,528 (entitled "Apparatus and Method for Determining the Amount of Material in A Tank"), all of which are incorporated by reference herein in their entireties for all purposes.

Figure 2:
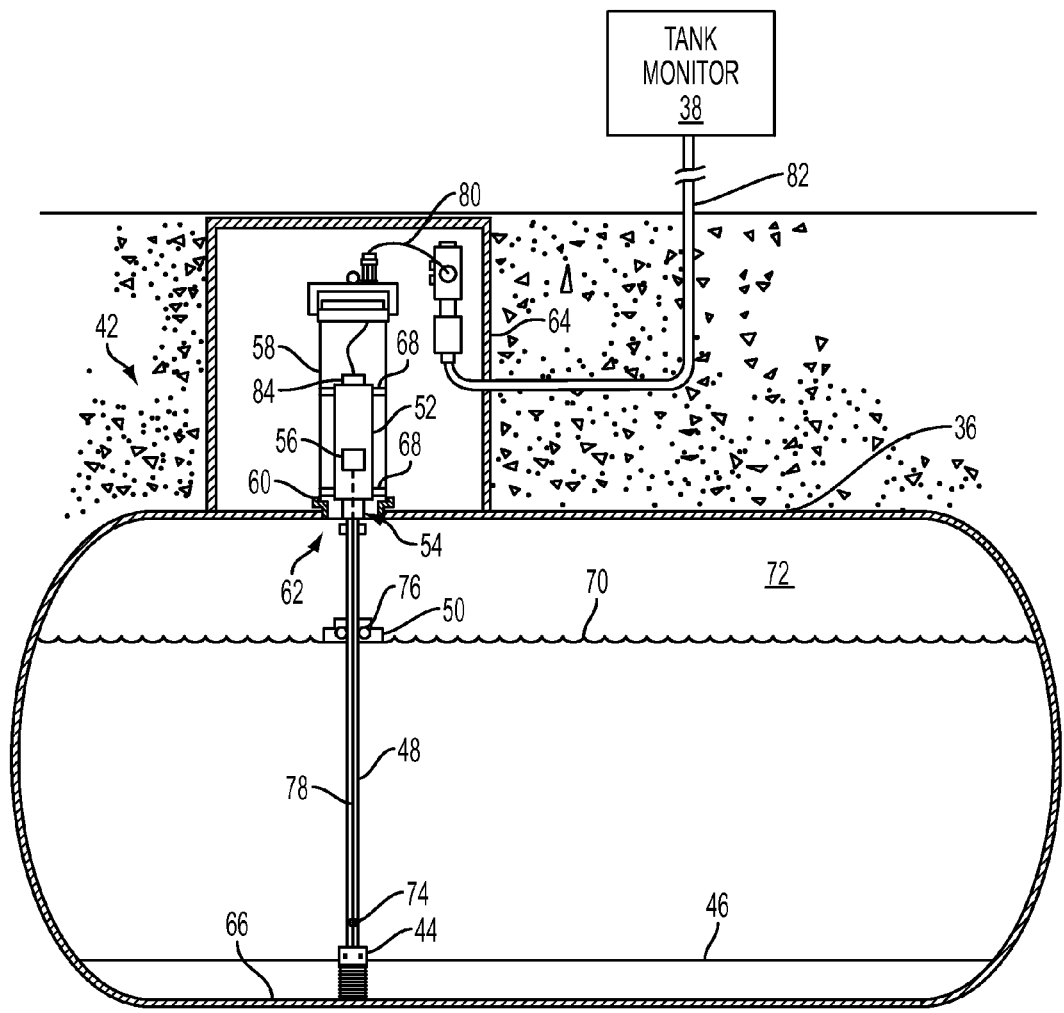
FIG. 2 is a cross-sectional view of a fuel storage tank having a magnetostrictive probe with a fuel quality sensor installed thereon.

FIG. 2 shows a magnetostrictive probe 42 installed in fuel storage tank 36. In this case, probe 42 comprises a fuel quality sensor 44 rather than a water-level float. To facilitate illustration of the components of magnetostrictive probe 42 and the issues involved in coupling fuel quality sensor 44 with magnetostrictive probe 42, the installation shown in FIG. 2 omits some of the components of a retrofit assembly described in further detail below.

In particular, as explained above, water may enter fuel storage tanks in various circumstances and reside in a layer at the bottom of the storage tank, forming a water-fuel interface 46. In many existing magnetostrictive probe installations, the probe may typically comprise a water level float that floats at interface 46. However, for fuel storage tanks containing a mixture of gasoline and ethanol (among other mixtures), it is desirable to employ a fuel quality sensor 44 to detect the onset and occurrence of phase separation. As shown in FIG. 2 and as described below, where fuel quality sensor 44 is added to magnetostrictive probe 42, it is difficult to provide electronic communication between fuel quality sensor 44 and tank monitor 38 without impairing operation of probe 42. The existing probe shaft 48 cannot typically receive new wiring, and it is undesirable to run wiring along the exterior of shaft 48 where it will be exposed to fuel. Moreover, the latter option may interfere with the vertical movement and operation of a product-level float 50.

As used herein, the term "fuel quality sensor" refers broadly to sensors adapted to detect and differentiate between phases of liquids (including but not limited to water, liquid fuel, and ethanol) in a mixture. For example, fuel quality sensor 44 may preferably be similar to that disclosed in U.S. Pub. App. No. 2010/0295565, entitled "Automated Phase Separation and Fuel Quality Sensor," which is incorporated herein by reference in its entirety for all purposes. However, any suitable fuel quality sensor may be used with embodiments of the present invention. Fuel quality sensor 44 may also detect the level of water in fuel storage tank 36.

Probe 42 may preferably be similar to the Mag Plus' Leak Detection Probe, sold by Veeder-Root Company. However, the present invention may be used with any suitable magnetostrictive probe. As shown, probe 42 includes probe shaft 48 that extends into fuel storage tank 36 and a canister 52 positioned outside of fuel storage tank 36. Canister 52 may be attached to probe shaft 48 via fittings 54. Canister 52 preferably includes electronics 56 which enable operation of probe 42, as explained below.

During installation, probe 42 may be lowered into fuel storage tank 36 through a riser pipe 58 that may be secured to fuel storage tank 36 via a tank adapter 60. Riser pipe 58 may typically be a four inch (10.16 cm) pipe. Fuel storage tank 36 may define an aperture 62 therein which provides an opening between the interior of riser pipe 58 and the interior of fuel storage tank 36. Riser pipe 58 may be positioned within a sump 64 as needed or desired. Probe shaft 48 extends through aperture 62, and a terminal end of probe shaft 48 is at or near the bottom 66 of fuel storage tank 36. In this case, the weight of probe 42 keeps the terminal end on bottom 66. Canister 52 may be spaced from the sides of riser pipe 58 by one or more spacers 68. It should be appreciated that spacers 68 may restrict horizontal movement of canister 52 but do not materially restrict vertical movement of canister 52.

Fuel rests on top of the water and an air/vapor-fuel interface 70 is formed at the ullage 72 of fuel storage tank 36. Probe shaft 48 extends through both interfaces 46, 70 and probe shaft 48 may comprise a reference magnet 74 positioned proximate its terminal end at a fixed, known distance therefrom. Reference magnet 74 may be disposed internal to probe shaft 48 or alternatively in a boot that is received over the end of probe shaft 47. Product-level float 50, typically an annular float, is received over probe shaft 48 and floats at air/vapor-fuel interface 70. A product-level magnet 76 is associated with product-level float 50 so that the level of fuel in fuel storage tank 36 may be ascertained. Float 50 is configured to move freely along shaft 48 as the level of fuel changes.

Those skilled in the art are familiar with the operation of magnetostrictive probes. Generally, to determine the fuel level in fuel storage tank 36, probe 42 generates an electric current with a current source within electronics 56. The current travels along a magnetostrictive wire 78 in shaft 48. Probe 42 is configured to detect at electronics 56 torsional wave reflections induced by magnet 76 of float 50 and reference magnet 74. The first reflection to arrive at electronics 56 is that of magnet 76 and the second reflection to arrive is that of reference magnet 74. Because the speed of the torsional wave in magnetostrictive wire 78 (e.g., 3000 m/s) is known and the times elapsed between generation of the pulse and receipt of the waves are known, it is possible to calculate the distance between electronics 56 and the magnet which induced the torsional wave. Electronics 56 may also calculate the distance between magnet 76 and magnet 74, the latter of which has a known, fixed height relative to tank bottom 66.

Probe 42 may preferably be in electronic communication with tank monitor 38 via a signal line 80 and conduit 82. Signal line 80 may be coupled with canister 52 using a connector 84. Thus, probe 42 may report the measured reflections to tank monitor 38. Tank monitor 38 may use the data from probe 42 to determine the level and thus, the amount, of fuel within fuel storage tank 36. For example, based on the height of float 50, a conventional tank strapping algorithm may be applied to convert fuel level to fuel volume.

Figure 3A:
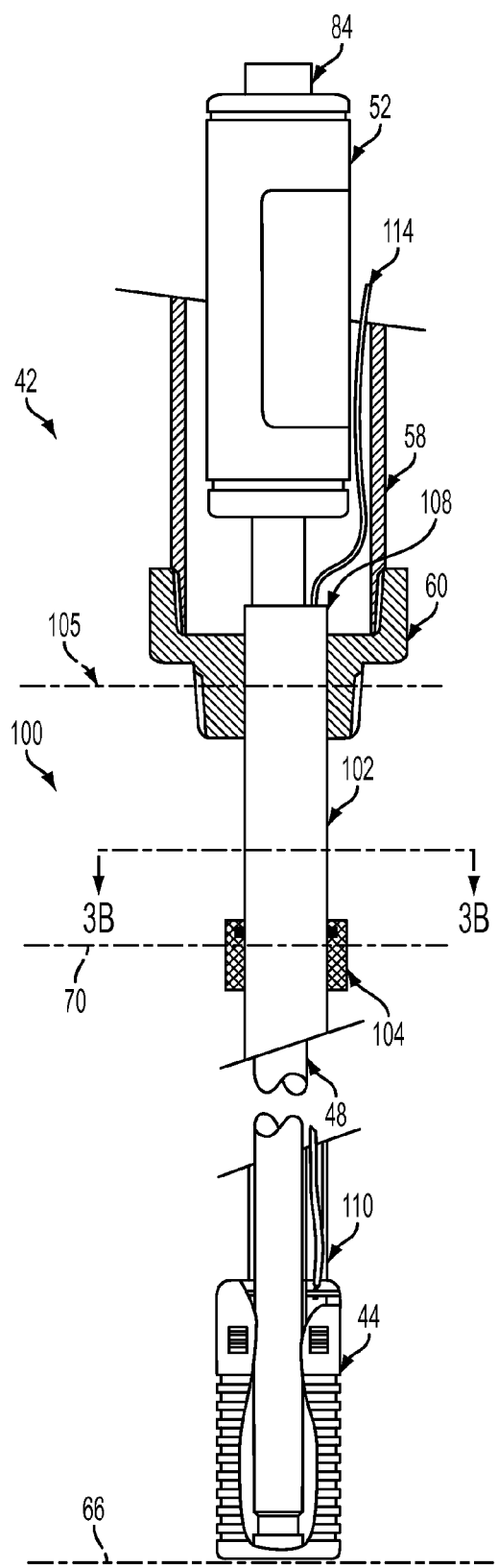
FIG. 3A is a partial cross-sectional view of a fuel quality sensor retrofit assembly positioned over the magnetostrictive probe of FIG. 2.
Figure 3B:
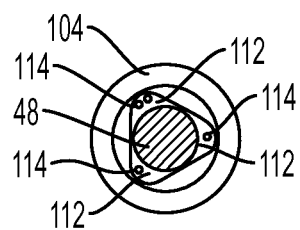
FIG. 3B is a cross-sectional view taken along the line 3B-3B in FIG. 3A.

A retrofit assembly according to one embodiment of the present invention is described below with reference to FIGS. 3A and 3B. In particular, FIG. 3A is a partial cross-sectional view of a retrofit assembly 100 used in conjunction with magnetostrictive probe 42. FIG. 3B is a cross-sectional view taken along the line 3B-3B in FIG. 3A. Generally, retrofit assembly 100 may facilitate the addition of wiring for fuel quality sensor 44 to an existing magnetostrictive probe (such as probe 42) without impairing the magnetostrictive probe's inventory measurement function and without exposing the wiring to fluids in fuel storage tank 36.

More particularly, retrofit assembly 100 comprises an isolation sheath 102 and a product-level float 104. As shown, isolation sheath 102 comprises an elongate conduit having a rounded triangular cross-sectional profile. Isolation sheath 102 may preferably define an aperture therethrough sized to snugly receive existing magnetostrictive probe shaft 48. Specifically, sheath 102 may define an open proximal end 108 extending above the interface 105 between fuel storage tank 36 and magnetostrictive probe 42 (illustrated in FIG. 3A as a dashed line) and an open distal end 110 configured to couple with fuel quality sensor 44. In some embodiments, proximal end 108 may be coupled with tank adapter 60 or an analogous component at interface 105, although this is not required. In any case, when sheath 102 is installed over shaft 48, the interior of sheath 102 is preferably isolated from fluids in storage tank 36.

The size and shape of the cross-sectional profile of isolation sheath 102 may preferably be selected to define one or more passages 112 along which wiring 114 (e.g., for electronic communication between fuel quality sensor 44 and tank monitor 38) may extend once sheath 102 is positioned on shaft 48. In other words, shaft 48 interfaces with sheath 102 to subdivide the aperture extending through sheath 102 into one or more passages 112 which serve as wireways for wiring 114. For example, the rounded triangular cross-sectional profile illustrated in FIG. 3B provides three such passages 112. The interface between sheath 102 and shaft 48 may be such that two or more passages 112 are discrete and separate, as shown; however, embodiments are contemplated in which a single, continuous passage 112 extends around the circumference of shaft 48 between shaft 48 and sheath 102. It will be appreciated that where the profile of sheath 102 defines more than one passage 112, not all passages need be used to contain wiring 114.

Thus, wiring 114 may extend from electronics in fuel quality sensor 44, through passages 112, out of fuel storage tank 36, and into riser pipe 58. Wiring 114 may then preferably extend out of riser pipe 58 and through conduit 82 for electronic communication with tank monitor 38. In the alternative (e.g., if space is not available in conduit 82 for new wiring), wiring 114 may be coupled with a multiplexer mounted on connector 84. The multiplexer may multiplex signals from electronics 56 and the fuel quality sensor electronics to be communicated to tank monitor 38.

Product-level float 104, which may preferably be analogous to product-level float 50, is adapted for vertical movement along isolation sheath 102 as the height of air/vapor-fuel interface 70 changes. The rounded corners of sheath 102's cross-sectional profile may facilitate vertical movement of product-level float 104 along sheath 102, although rounded corners are not required. Because isolation sheath 102 is received over magnetostrictive probe shaft 48, product-level float 104 may have an internal diameter greater than that of product-level float 50 to accommodate isolation sheath 102.

However, as explained above, retrofit assembly 100 must be configured not to interfere with the operation of magnetostrictive probe 42. Importantly, therefore, isolation sheath 102 may preferably be thin-walled and may be formed of a material transmissive to the magnetic fields of the magnet in product-level float 104 and magnetostrictive wire 78. In some embodiments, isolation sheath 102 may be formed of stainless steel. In other words, isolation sheath 102 may be thin enough to allow effective interaction between product-level float 104 and magnetostrictive wire 78. Those skilled in the art can select a suitable thickness for the walls of the isolation sheath for a particular magnetostrictive probe. For example, isolation sheath 102 may be approximately 0.049" in thickness in some embodiments. Moreover, the cross-sectional profile of sheath 102 is preferably selected to minimize the distance between the magnet in float 104 and shaft 48 while also providing passages 112 of sufficient size to carry wiring 114.

Figure 4:
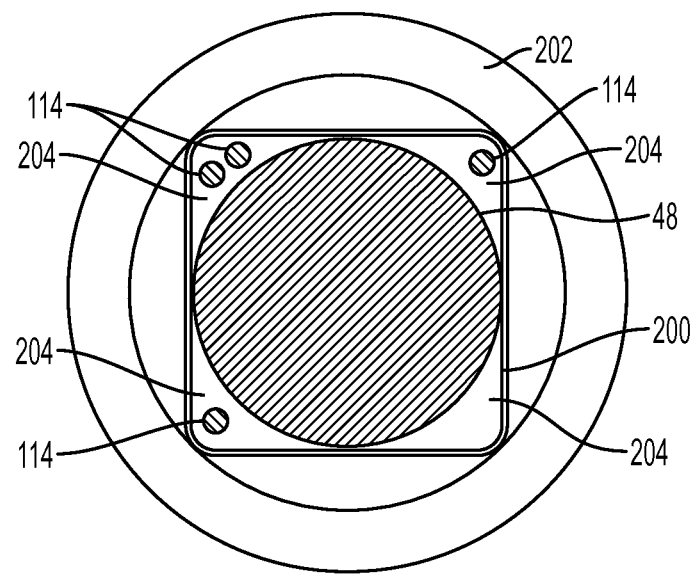
FIG. 4 is an enlarged view similar to FIG. 3B but showing an isolation sheath according to a further embodiment of the present invention.

Those of skill in the art will appreciate that the isolation sheath may define a cross-sectional profile of any suitable shape which accommodates probe shaft 48 and sensor wiring 114. In this regard, for example, FIG. 4 shows an isolation sheath 200 having a rounded square cross-sectional profile according to a further embodiment of the present invention. A product-level float 202, which is preferably analogous to float 104, may be sized to travel vertically along isolation sheath 200. Also, as shown, isolation sheath 200 may define four passages 204 for wiring 114. According to further embodiments, the isolation sheath of the retrofit assembly may define a round, oval, or other suitable cross-sectional profile.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A retrofit assembly for use with a fuel level probe having a shaft extending through a tank interface into a fuel storage tank, said shaft comprising a magnetostrictive element extending therealong, said retrofit assembly comprising:
   a fuel quality sensor for mounting to a terminal end of said probe;
   an isolation sheath having a proximal end and a distal end, said isolation sheath sized to be received over said fuel level probe shaft and extend between said fuel quality sensor and said tank interface;
   said isolation sheath having a cross-sectional profile configured to define at least one passage when said isolation sheath is received over said fuel level probe shaft, said at least one passage extending between said proximal end and said distal end of said isolation sheath; and
   a product-level float comprising at least one product-level magnet for measuring the level of fuel in said fuel storage tank, said product-level float configured to translate along said isolation sheath as the level of fuel in said fuel storage tank changes.

2. The retrofit assembly of claim 1, wherein said isolation sheath permits electromagnetic interaction between said magnetostrictive element and said product-level magnet.

3. The retrofit assembly of claim 2, wherein said isolation sheath is thin-walled.

4. The retrofit assembly of claim 1, wherein said at least one passage is sized to receive wiring extending from said fuel quality sensor.

5. The retrofit assembly of claim 4, wherein said fuel level probe is in electronic communication with a tank monitor.

6. The retrofit assembly of claim 5, wherein said wiring extends to said tank monitor.

7. The retrofit assembly of claim 5, wherein said fuel level probe comprises a canister having electronics therein and wherein signals from said electronics are multiplexed with signals from said fuel quality sensor.

8. The retrofit assembly of claim 5, wherein said product-level float is annular.

9. The retrofit assembly of claim 1, wherein said cross-sectional profile of said isolation sheath is triangular.

10. The retrofit assembly of claim 1, wherein said cross-sectional profile of said isolation sheath is square.

11. The retrofit assembly of claim 1, wherein said fuel quality sensor is configured to detect the onset and occurrence of phase separation.

12. A method of installing a fuel quality sensor with a fuel level probe in a fuel storage tank, said method comprising the steps of:

extending an isolation sheath over a shaft of said probe, said isolation sheath defining at least one longitudinal passage between said isolation sheath and said fuel level probe shaft;

coupling said fuel quality sensor with a terminal end of said fuel level probe shaft;

providing a product-level float along said isolation sheath for measuring the level of fuel in said fuel storage tank, said product-level float configured to translate along said isolation sheath; and extending wiring between said fuel quality sensor and said tank interface along said at least one longitudinal passage.

13. The method of claim 12, wherein said product-level float comprises at least one product-level magnet adapted for electromagnetic communication with said magnetostrictive element across said isolation sheath.

14. The method of claim 13, further comprising providing electronic communication between said wiring and a tank monitor.

15. The method of claim 14, wherein said fuel level probe comprises a canister having electronics therein.

16. The method of claim 15, further comprising multiplexing signals from said fuel quality sensor with signals from said electronics in said canister and transmitting said multiplexed signals to said tank monitor.

17. The method of claim 12, wherein said isolation sheath defines a plurality of longitudinal passages.

18. The method of claim 12, wherein the cross-sectional profile of said isolation sheath is triangular.

19. The method of claim 12, further comprising forming said isolation sheath to isolate said wiring from fluids in said fuel storage tank.

20. A fuel level probe for use with a fuel storage tank, said fuel level probe comprising:

a shaft extending through a tank interface into said fuel storage tank, said shaft comprising a longitudinal magnetostrictive element;

a fuel quality sensor coupled with a terminal end of said shaft in said fuel storage tank;

an isolation sheath installed along said fuel level probe shaft between said fuel quality sensor and said tank interface;

said isolation sheath defining a plurality of longitudinal passages between said isolation sheath and said fuel level probe shaft for carrying wiring extending from said fuel quality sensor out of said fuel storage tank;

a product-level float for measuring the level of fuel in said fuel storage tank, said product-level float configured to translate along said isolation sheath;

wherein said product-level float comprises at least one product-level magnet adapted for electromagnetic communication with said magnetostrictive element across said isolation sheath.

* * * * *